- GLASS FIBER FORMING
- DEPOSITION OF METAL COATING ON GLASS FIBER SURFACE
- COMBINATION WITH ELASTOMER IN REDUCING ATMOSPHERE

INVENTOR
Alfred Marzocchi
by Staelin & Overman
Att'ys

Jan. 1, 1974  A. MARZOCCHI  3,782,999
GLASS FIBER REINFORCED ELASTOMERS
Filed July 7, 1971  2 Sheets-Sheet 2

INVENTOR
Alfred Marzocchi
by Staelin & Overman
Attys

United States Patent Office 3,782,999
Patented Jan. 1, 1974

3,782,999
GLASS FIBER REINFORCED ELASTOMERS
Alfred Marzocchi, Cumberland, R.I., assignor to
Owens-Corning Fiberglas Corporation
Filed July 7, 1971, Ser. No. 160,388
Int. Cl. B32b 15/14, 17/06; C23c 13/00
U.S. Cl. 117—71                               10 Claims

ABSTRACT OF THE DISCLOSURE

This invention is addressed to the improvement in the bonding relationship between glass fibers and elastomeric materials wherein glass fibers are provided with a coating of a nascent metal and then combined directly with elastomeric materials, or further coated with an elastomeric material for use in the manufacture of glass fiber reinforced elastomeric products. The coating steps take place in a non-oxidizing atmosphere, and preferably a reducing atmosphere.

---

This invention relates to elastomeric products reinforced or otherwise combined with glass fibers and it relates more particularly to the method and compositions employed in the treatment of the glass fibers to enhance the bonding relationship between the glass fibers and the elastomeric material for making more complete utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarn and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continouus and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene, and preferably an alkylene or alkylidene norbornene, such as 5-alkylidene-2-norbornene and the like in which the alkylidene group numbers from 2–12 carbon atoms.

The invention is addressed to the more complete utilization of the desirable characteristics of glass fibers, such as their high strength, flexibility, thermal stability, chemical stability, inertness, electrical resistance and heat conductive characteristics when used in combination with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and as molded elastomeric products.

It is an object of this invention to provide a new and improved method for the treatment of glass fibers preferably in forming, or afterwards, to enable more complete utilization to be made of the desirable characteristics of the glass fibers when used in combination with elastomeric materials in the manufacture of glass fiber reinforced molded products and coated fabrics.

More specifically, it is an object of this invention to provide a method for use in the treatment of glass fibers in forming to improve the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics.

These and other objects and advantages of this invention will hereinafter appear and, for purposes of illustration, but not of limitation, an embodiment of the invention is shown in the accompanying drawing in which.

The combination of glass fibers with elastomeric materials in the manufacture of glass fiber-reinforced elastomeric products is now well known to the art. Such glass fibers are dispersed or distributed in the elastomeric material with the latter constituting a continuous phase. It is generally the practice to make use of glass fibers in the form of individual glass fibers having a coating on the surfaces thereof to intertie the individual glass fibers to the elastomeric material in which the glass fibers are distributed, or in the form of yarns, cords or fabrics, hereinafter referred to as bundles, containing an impregnant therein which also serves to intertie the glass fiber bundles to the elastomeric material in which the bundles are distributed.

In either case, one of the problems which has been encountered is the problem of securely anchoring the glass fiber surfaces to the elastomeric material in which the glass fibers are distributed. It is believed that this difficulty in part stems from the completely smooth, rod-like surfaces of the glass fibers and in part from the fact that the glass fiber surfaces are highly hydrophilic in nature, thereby resulting in the formation of a thin but tenacious film of moisture on the glass fiber surfaces which serves to destroy any bond, chemical or physical, which would otherwise be formed between the glass fiber surfaces and the elastomeric material. Substantial progress has been made by those most highly skilled in the art in promoting the bonding relationship between glass fibers and elastomeric materials, although there is nevertheless room for further improvements.

It has now been found in accordance with the concepts of the present invention that the bonding relationship between glass fibers and elastomeric materials in the manufacture of glass fiber-elastomeric products can be significantly improved by combining glass fibers having a metal coating on the surfaces thereof in a nascent state with elastomeric material or with an elastomer compatible material. Without limiting the present invention as to theory, it is believed that the metal coating, since it is in the nascent state, is reactive with the elastomer or elastomer compatible material to form a chemical bond therewith to more securely tie the glass fiber surfaces with the elastomeric material.

Figure 1:
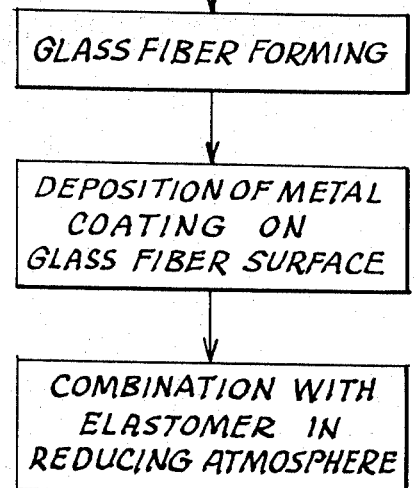
FIG. 1 is a flow diagram describing the method of the invention.

In accordance with one embodiment of the invention, glass fibers are coated, preferably but not necessarily, in forming with a coating in the nascent state, and the resulting coated fibers are combined directly with an elastomeric material in the manufacture of glass fiber reinforced elastomeric products in a non-oxidizing atmosphere, and preferably a reducing atmosphere. This embodiment is illustrated by way of a flow diagram in FIG. 1 of the drawing. In the practice of this embodiment, glass fibers are formed in conventional manner and then coated with a metal in accordance with any of a number of procedures known to those skilled in the art, such as the coating methods described in U.S. Pats. Nos. 2,907,886 and 2,940,886. As described in these patents, application of the desired metal coating can be achieved by the use of molten baths, metallizing, glass plating, vapor deposition, fused salts and/or electrolytes.

The resulting fibers are then subjected to a non-oxidizing, and preferably a reducing atmosphere to insure that the metal of the coating is maintained in a nascent state free from the formation of any metal oxide on the fiber surfaces. For this purpose, use can be made of any reducing gas, such as hydrogen, carbon monoxide, etc. If desired, the coated fibers, while still in a reducing atmosphere, can be plied and/or twisted with other fibers to form yarns, cords, strands or fabrics, and laid down in the desired arrangement or otherwise combined with elastomeric material in the presence of a reducing atmosphere. The combination of the metal coated fibers and elastomeric material is processed in a conventional manner under heat and pressure to advance the elastomeric material to an advanced state of cure and/or vulcanization. For this purpose, it is generally desirable to formulate the elastomeric component which is combined with the treated glass fibers to include conventional vulcanizers and/or curing agents of the type normally used in elastomeric material.

It is believed that the tie-in between the nascent metal coating on the glass fibers and the elastomeric material occurs primarily during cure and/or vulcanization to securely integrate the glass fibers with the elastomeric material. Since the metal coating on the glass fibers is maintained under a reducing atmosphere at all times subsequent to its formation, the metal is retained in a nascent state whereby only the nascent metal coating is contacted with the elastomeric material for the formation of chemical bonds between the metal present in the coating and the elastomeric material.

In accordance with another embodiment of the invention, glass fibers which have been coated as described above with a coating of a nascent metal are further coated with an elastomer compatible material to form a thin coating of the elastomer compatible material on the metal. The double coated fibers can then be directly combined with elastomeric materials or be formed into yarns, cords, strands or fabrics, hereinafter referred to as bundles, for impregnation with the same or different elastomer compatible material for subsequent combination of the impregnated bundles with elastomeric materials in the manufacture of glass fiber reinforced elastomeric products.

Figure 2:
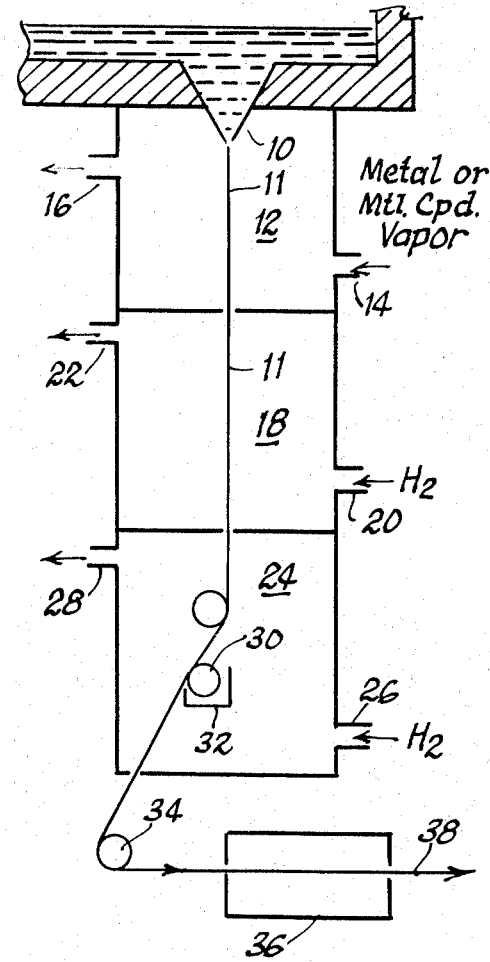
FIG. 2 is a schematic flow diagram showing the manufacture of continuous glass fibers and the treatment thereof in forming to improve the performance characteristics of glass fibers when used in combination with elastomeric materials in the manufacture of glass fiber reinforced elastomeric products in accordance with one embodiment of this invention.

One suitable method embodying the features of this invention for the preparation of such double coated fibers is schematically illustrated in FIG. 2 of the drawing. As shown in this figure, there is provided a conventional furnace 10 from which molten glass flows gravitationally through a suitable bushing to form glass filaments 11 which are passed into a coating zone 12 in which the individual filaments are coated with a metal in accordance with the methods described above to form a metal coating on the glass fiber filaments. For this purpose, use is preferably made of the vapor of a metal or of a metal compound introduced through inlet 14; exhaust gases are removed through exit 16. When use is made of the vapor of a metal for coating the glass fiber filaments, it is generally desirable to carry out the coating operation under reduced pressures to lower the boiling point of the metal employed. However, it will be understood that while reference has been made to the use of the source of a coating metal in the form of a vapor, use can also be made of liquid baths as the source of coating metal as described in the foregoing U.S. patents.

From the coating zone, the coated glass fibers are advanced into a second zone in which they are exposed to a reducing atmosphere provided by hydrogen or the like gas passed through zone 18 by inlet 20 and outlet 22 to insure that the metal thus deposited on the glass fibers is maintained in a nascent state. From the reducing zone 18, the metal coated fibers are advanced into a second coating zone 24 in which the metal coated fibers are provided with a second coating of the elastomer compatible material. The coating of the elastomer compatible material can be provided in any desired manner. As shown in FIG. 2, the fibers are passed over a roller 30 which is constantly wet with the liquid elastomer compatible coating composition contained in bath 32 while a reducing gas is passed through zone 24 by way of inlet 26 and outlet 28 to maintain the metal coating in the nascent state during the coating operation.

The double coated fibers are then passed under a roller 34 for passage to a drying oven 36, preferably in the form of an air drying oven to dry the elastomer compatible material in the applied coating and to set the material in situ. However, if desired, the oven may be omitted and the fibers allowed to air dry. It has been found that best results are usually obtained when use is made of a drying oven maintained at a temperature from 150 to 350° F., since the heat thus provided serves in part to initiate the chemical reaction between the nascent metal coating and the elastomer compatible material.

The resulting double coated fibers 38 can, as indicated above, be combined directly without further processing, or be plied and/or twisted with other fibers to form bundles of fibers which can be subjected to further treatment as by impregnation in accordance with known procedures to form impregnated bundles for combination with elastomeric materials.

Figure 3:
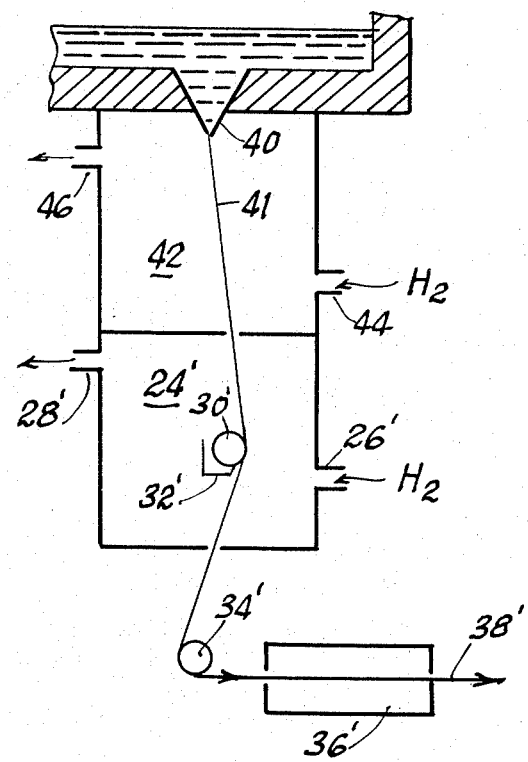
FIG. 3 is a schematic flow diagram similar to that shown in FIG. 1 of the formation and treatment of glass fibers in accordance to an alternative embodiment of this invention.

By way of modification, the method described with reference to FIG. 2 can be carried out by formulating the glass composition in the glass melting furnace whereby the metal migrates to the surface of the glass fibers as described in U.S. Pat. No. 2,940,886. Thus, as illustrated in FIG. 3 of the drawing, the first coating zone in which the metal is deposited on the glass fibers can be omitted since the metal atoms migrate to the glass fiber surfaces to form a metal coating thereon, which is maintained in a nascent state by passing the formed glass fibers 41 through a reducing zone 42. Thereafter, the fibers are coated with the elastomer compatible material in zone 24' in accordance with the method described above in the presence of a reducing atmosphere.

Figure 4:
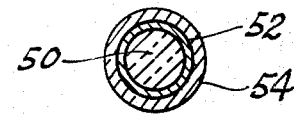
FIG. 4 is a cross-sectional view of glass fibers processed in accordance with the diagram illustrated in FIG. 1 or 2.

In either case, the fibers thus produced, as shown in FIG. 4 of the drawing, are in the form of a glass fiber 50 having an inner coating 52 of the metal and an outer coating 54 of the elastomer compatible impregnant.

As the metal forming the nascent metal coating, use can be made of a number of metals capable of having a valence of +2 or higher. Preferred metals include iron, aluminum, magnesium, zinc, cadmium, nickel, cobalt, tungsten, etc. Magnesium appears to be the most reactive of the foregoing metals, and is therefore frequently preferred for use in the present invention.

As indicated above, use can be made of a substantially pure metal in the molten or vaporous state to deposit the metal coating. In addition, use can also be made of compounds of the foregoing metals capable of supplying the metal under non-oxidizing or reducing conditions. Preferred compounds are the metal carbonyl and metal hydride derivatives of the foregoing metals.

The amount of metal deposited on the glass fibers is not critical and can be varied within wide ranges, so long as the thickness of the metal coating does not deleteriously affect the fibrous characteristics of the glass fibers. In general, a mono-molecular layer of the metal coating on the glass fiber surfaces is sufficient, although best results are usually achieved when the thickness of the metal coating is within the range of 0.01 to 2 microns, or the metal coating constitutes from 0.01 to 1% by weight of the glass fibers. When use is made of vapor deposition to form the nascent metal coating, the amount of metal deposited on the glass fiber surfaces can be conveniently controlled by regulating the temperature and pressure of the vaporous metal in the first coating zone since the fibers in essence serve as condensers for the vaporous metal.

When the metal component is formulated into the glass composition, use can be made of the metal in elemental form or in the form of compounds thereof which are capable of forming the elemental metal. Thus, as fibers are drawn from the metal-bearing molten glass, the metal atoms migrate to the surfaces of the fibers. For a more detailed description of this phenomenon, reference can be made to "The Electrical Properties of Glass Fiber Paper," NRL Report 4042 by Thomas D. Callinan and Robert T. Incas, Naval Research Laboratory, Washington, D.C. The amount of metal formulated in the glass composition is not critical and can be varied within wide ranges. To achieve the coating thicknesses and/or coatng weights described above, it is generally desirable that the glass composition contain from 0.01 to 1.5% by weight of the metal.

Having described the basic concepts of the invention, reference is now made to the following examples which are provided by way of illustration, and not by way of limitation, of the practice of the invention.

EXAMPLE 1

This example illustrates the combination of glass fibers having a nascent magnesium coating with natural rubber.

Glass fibers are drawn through a bushing in a conventional glass melting furnace. Just below the bushing, the glass fibers are passed through a zone containing magnesium vapor, the temperature and pressure of which is maintained to deposit 0.1% by weight magnesium vapor on the glass fibers. The coated glass fibers are then passed to a second zone containing hydrogen in which the magnesium coated glass fibers are combined with natural rubber, and molded under conditions of heat and pressure to form a glass fiber reinforced elastomeric product. It is found that a secure bond between the glass fiber surfaces and the natural rubber constituting the continuous phase of the elastomeric material is obtained.

EXAMPLE 2

In this example the procedure described in Example 1 is repeated using aluminum vapor to coat the glass fibers in forming. The resulting fibers are found to contain 0.12% by weight aluminum on the surfaces thereof. The coated fibers are then combined with chlorobutyl rubber under a hydrogen atmosphere to maintain the aluminum coating on the fiber surfaces in a nascent state. Comparable results are obtained.

EXAMPLE 3

The procedure of Example 1 is again repeated using butadiene-styrene rubber and cobalt. Metallic cobalt is formulated into a glass composition in the amount of 0.2% by weight, and the resulting composition is drawn from a conventional furnace to form glass fibers. Analysis indicates that the cobalt coating formed on the surfaces of the glass fibers due to migration of the cobalt metal to the surfaces of the glass fibers during forming constitutes about 0.091% by weight.

The resulting cobalt coated fibers are then combined with butadiene-styrene rubber under a hydrogen blanket to produce glass fiber reinforced elastomeric products.

EXAMPLE 4

This example illustrates the concepts of the present invention in which a magnesium coating is formed on the glass fiber surfaces, and the resulting glass fibers are coated with an elastomer compatible material.

Using the method described in FIG. 2 of the drawing, glass fibers are drawn from the bushing of a glass melting furnace and contacted in a metal coating zone with magnesium vapor. Thereafter, the fibers are passed through a reducing zone containing hydrogen gas, and then to a second coating zone in which the fibers are coated by means of a roller applicator which is constantly wet with a dispersion of natural rubber in benzene containing 30% by weight solids.

Analysis indicates that the resulting fibers contain 0.15% by weight magnesium based on the weight of the glass fibers, and 7% by weight based on the total weight of the glass fibers plus magnesium coating.

It will be understood that a variety of elastomer compatible materials can be used in lieu of the natural rubber described above. In general, use can be made of either an elastomer of the type described above or a blend of an elastomer with a resin as the elastomer compatible material in accordance with this concept of the invention. It is generally desirable that, regardless of whether use is made of an elastomer alone or a blend of an elastomer with a resin, substantially dry materials be employed since the presence of moisture would serve to destroy the nascent state of the metal coating on the glass fibers on contact therewith. For this purpose, use is preferably made of an elastomer or a blend of an elastomer with a resin dispersed in an inert, dry organic solvent, such as aromatic hydrocarbon solvent (e.g., benzene, toluene, xylene, etc.); aliphatic alcohols, such as ethanol, propanol, isopropanol, butanol, hexanol, etc.; aliphatic ketones, such as acetone, methylethyl ketone, diethyl ketone, etc.; as well as a number of other inert solvents well known to those skilled in the art.

As indicated, use can be made of an elastomer blended with a resin as the elastomer compatible material. One of the most preferred elastomer compatible materials for use in the present invention are combinations of a basic elastomer and a resorcinol-aldehyde resin prepared in the presence of a primary or secondary alkylamine in which the alkyl group contains 1–4 carbon atoms. Such impregnants are commercially available in aqueous form under the trade name "Lotol" of the U.S. Rubber Company, and the method for the preparation of same is described in Canadian Pat. No. 435,754. As described in this Canadian patent, resorcinol is reacted in aqueous medium with a lower aliphatic aldehyde, and preferably formaldehyde, in a mole ratio of at least 2.0 moles of aldehyde per mole of resorcinol in the presence of the amine in a mole ratio of at least 1.3 moles of amine per mole of resorcinol to form an aqueous solution of resorcinol-aldehyde resin, which can be added to an alkaline elastomer latex without the precipitation of the resin or coagulation of the latex. As used in the present invention, it is generally preferred that such blends of resorcinol aldehyde resin and elastomer be dried to effect substantially complete removal of aqueous medium, and then suspended in one or more of the inert non-aqueous solvents described above for application to the glass fibers containing a nascent metal coating.

However, a variety of other well-known elastomer compatible materials can be used in the practice of the invention in lieu of the blend of resorcinol-aldehyde resin and elastomer described above. As the resin component, use can be made of polyesters, polyamides, melamine formaldehyde resins, urea formaldehyde resins, and polyepoxide resins. These resin components can be blended with one or more of the foregoing elastomeric materials and the resulting blend suspended in an inert solvent. Alternatively, the elastomer component and the resin component can be dispersed separately in one or more solvents, and the resulting dispersions combined for use in accordance with this invention.

Additional examples of this concept of the invention may be illustrated by way of the following examples.

EXAMPLE 5

The procedure described in Example 4 is repeated using iron carbonyl as a source of iron to coat glass fibers in forming and provide a coating on the glass fiber surfaces constituting about 0.083% by weight iron. The resulting fibers are then passed through a reducing zone containing hydrogen to insure that the iron coated fibers maintain their nascent state, and then are coated with a dispersion of neoprene rubber in toluene under a hydrogen atmosphere. The neoprene rubber dispersion is applied in an amount sufficient to provide a double coated fiber containing between 1 and 12% by weight of the elastomer compatible material based upon the total weight of the metal coating and the glass fiber.

EXAMPLE 6

The procedure described in Example 4 is again repeated using zinc vapor to coat glass fibers in forming and to form a zinc coating constituting about 0.102% by weight of the glass fibers. The zinc coated fibers are then passed through a reducing zone containing hydrogen gas to insure that the zinc coating is maintained in a nascent state, and then coated with a blend of natural rubber and resorcinol-formaldehyde resin obtained from the solids deposited in benzene in an amount sufficient to provide a solids content of about 25% by weight.

EXAMPLE 7

The procedure described in Example 4 is again repeated using nickel carbonyl as a source of nickel in coating glass fibers to provide fibers containing 0.15% by weight nickel on the surfaces thereof. The resulting fibers are passed through a reducing zone containing hydrogen gas and are then coated under an atmosphere of hydrogen gas with a blend of 70% butadiene-styrene rubber and 30% melamine-formaldehyde resin dispersed in isopropanol containing about 24% by weight dry solids.

EXAMPLE 8

This example illustrates the preparation of glass fibers having tungsten coating prepared by formulating a glass composition to contain tungsten metal.

In this example, a glass melt is formulated to contain about 0.1% by weight tungsten metal, and glass fibers are drawn from the melt in a conventional manner whereby the tungsten atoms contained in the melt migrate to the surfaces of the resulting glass fibers to form a tungsten coating constituting about 0.073% by weight of the glass fibers. The resulting glass fibers as they are formed are passed through a hydrogen zone of the type illustrated in FIG. 3 and are then coated with a blend of natural rubber and resorcinol-formaldehyde resin of the type employed in Example 6.

By way of modification, it is possible and sometimes desirable to formulate the elastomer compatible coating composition to contain a glass fiber anchoring agent such as an organo silane to further improve the adhesion of the elastomer compatible material to the nascent metal coating.

Representative of suitable anchoring agents are the organo silicons, their hydrolysis products and polymerization products (polysiloxane) of an organo silane have the following formula:

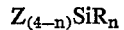

wherein Z is a readily hydrolyzable group such as alkoxy having 1–4 carbon atoms (e.g., methoxy, ethoxy, propoxy, etc.) or halogen, such as chlorine, $n$ is an integer from 1 to 3, and R is hydrogen or an organic group in which at least one R group is an alkyl group having 1–10 carbon atoms, such as methyl, ethyl, propyl, etc.; alkenyl having 1–10 carbon atoms, such as vinyl, allyl, etc.; cycloalkyl having 4–8 carbon atoms, such as cyclopentyl, cyclohexyl, etc.; aryl having 6–10 carbon atoms, such as phenyl, naphthyl, benzyl, etc.; alkoxy alkyl, such as methyloxyethyl, etc.; alkenylcarbonyloxyalkyl, such as carbonylpropylmethoxy, etc.; as well as the amino, epoxy, mercapto and halogen derivatives of the foregoing groups.

Illustrative of suitable silanes are ethyltrichlorosilane, propyltrimethoxy silane, vinyl trichloro silane, allyl triethoxy silane, cyclohexylethyltrimethoxy silane, phenyl trichloro silane, phenyl dimethoxy silane, methacryloxypropyltrimethoxy silane, gamma-aminopropyltriethoxy silane, beta-aminovinyldiethoxy silane, N-(gamma-triethoxysilylpropyl)propylamine, gamma - aminoallyltriethoxy silane, para-aminophenyltriethoxy silane, N-(beta-aminoethyl) - gamma - aminopropyltrimethoxy silane, gamma-chloropropyltrichloro silane, glycidoxy propyltrimethoxy silane, 3,4-epoxy-cyclohexylethyltrimethoxy silane, gamma-mercaptopropyltrimethoxy silane as well as a wide variety of others. It will be understood that the foregoing may be used in the form of the silane, the silanol or the polysiloxane formed by one or more of the foregoing materials.

When use is made of such organo silanes, they preferably constitute between 0.1 to 5% by weight of the elastomer compatible coating composition. Coating compositions formulated to include such silanes may be illustrated by the following examples.

EXAMPLE 9

Treating composition

| | Percent by wt. |
|---|---|
| Natural rubber in benzene (20% by weight solids) | 98 |
| Vulcanizing agent | 1 |
| Gamma-aminopropyltriethoxy silane | 1 |

EXAMPLE 10

Treating composition

| | Percent by wt. |
|---|---|
| Neoprene rubber in benzene | 98.5 |
| 3,4-epoxycyclohexylethyltrimethoxy silane | 1.5 |

EXAMPLE 11

Treating composition

| | Percent by wt. |
|---|---|
| Blend of natural rubber and resorcinol formaldehyde resin dispersed in ethanol (30% by weight solids) | 99 |
| Delta-aminobutyltrimethoxy silane | 1 |

The foregoing treating compositions can be applied to glass fibers containing a nascent metal coating in accordance with the procedures described in Examples 4–8, in the presence of a non-oxidizing atmosphere, and preferably a reducing atmosphere to insure that the metal coating retains its nascent characteristics without undesirable oxide formation during the coating with the elastomer compatible material.

As indicated above, glass fibers treated in accordance with Examples 4–11 can be combined directly with elastomeric materials in the manufacture of glass fiber reinforced elastomeric products without further processing, or they may be subjected to further processing as the impregnation of bundles of such fibers in accordance with known techniques. For example, glass fibers which have been treated in accordance with the procedure described in Examples 4–11 can be plied or twisted together to form bundles of a plurality of glass fibers and impregnated with an elastomer compatible material which may be the same or different from the elastomer compatible material employed in coating the glass fibers containing a nascent metal coating. One of the preferred impregnants for use in accordance with the practice of the invention is the impregnant described above formulated to contain a basic elastomer latex and a resorcinol-aldehyde resin. As indicated, such impregnants are commercially available under the trade name "Lotol." Another elastomer compatible material which can be used as an impregnant in accordance with this invention includes terpolymer latices in which the terpolymer is formed of butadiene-styrene-vinyl pyridine. Such terpolymers are available from the General Tire and Chemical Company under the trade name "Gentac" or from the Goodyear Tire and Rubber Company under the trade name "Pliolite VP 100." Such terpolymers generally contain about 15% by weight vinyl pyridine, 15% by weight styrene and 70% by weight butadiene.

This concept of the invention can be illustrated by way of the following examples.

EXAMPLE 12

Glass fibers treated in accordance with Example 4 are formed into bundles and impregnated with the following impregnating composition.

|  | Percent by wt. |
|---|---|
| Natural rubber latex-resorcinol formaldehyde resin (38% solids—"Lotol 5440") | 30 |
| Water | 70 |

Figure 5:
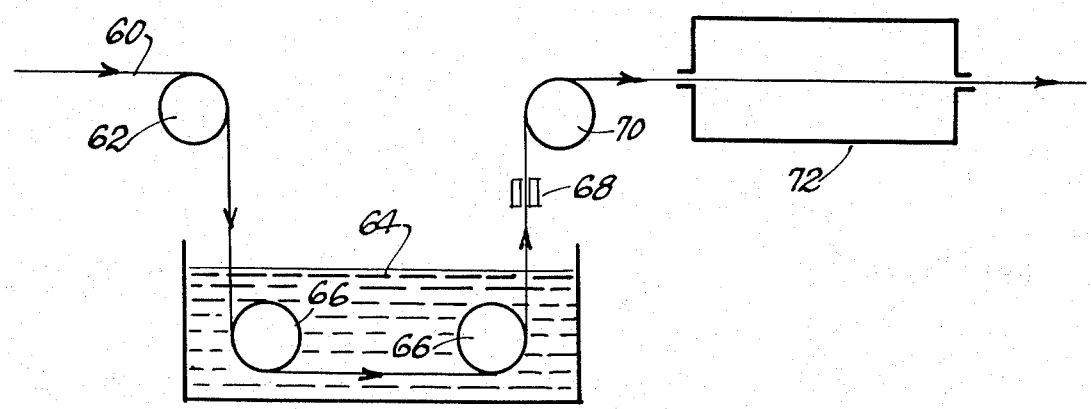
FIG. 5 is a flow diagram illustrating the optional treatment of glass fibers subsequent to their being formed into bundles.

Impregnation with the foregoing composition can be effected by conventional means for impregnation. Referring specifically to FIG. 5 of the drawing, a strand 60 of glass fibers which have been treated in accordance with the procedures described in Example 4 is passed over a guide roller 62 for passage downwardly into an impregnating bath 64 containing the aqueous impregnating composition of this example. The bundle is then turned under a pair of rollers 66 to effect a sharp bend in the bundle which operates to open the bundle to facilitate more complete penetration of the aqueous impregnating composition in the bundle of glass fibers for complete impregnation of the bundle. The impregnated bundle is then raised from the bath for passage through an orifice or die 68 which operates to remove excess impregnating composition from the bundle and to work the impregnating composition into the bundle. Thereafter, the endless bundle is advanced over roller 70 into a drying oven 72, preferably in the form of an air drying oven maintained at a temperature above ambient temperature, and preferably within the range of 150–250° F. to accelerate removal of the aqueous diluent and to set the impregnant in situ in the fiber bundle. Drying will occur in a relatively short time, generally within the range of 1–30 minutes depending, of course, upon the temperature of drying. Alternatively, use may be made of dielectric treatment to coagulate the latex with little or no drying.

Figure 6:
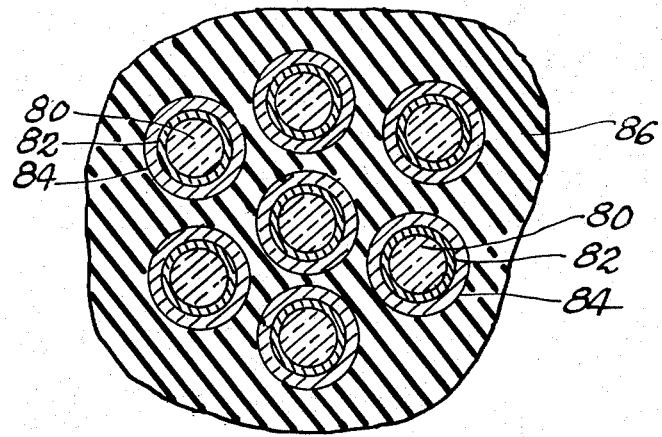
FIG. 6 is a cross-sectional view of a glass fiber bundle processed in accordance with the diagram illustrated in FIG. 5.

The resulting bundle is shown in cross section in FIG. 6 of the drawing. As can be seen from this figure, the bundle is formed of a plurality of glass fibers 80, each of which has an inner coating 82 formed of the nascent metal and an outer coating 84 formed of the elastomer compatible material applied to the fibers immediately subsequent to application of the nascent metal. The impregnant 86 which completely penetrates the bundle serves to separate the fibers each from the other and to form a unitary bundle structure. It is believed that the tie-in between the glass fibers and the impregnant 86 occurs during cure or vulcanization of the impregnated bundle in combination with elastomeric material in the manufacture of glass fiber reinforced elastomeric products.

EXAMPLE 13

The procedure described in Example 12 is repeated using bundles of fibers in which the individual fibers have been treated in accordance with the procedure described in Example 8. Impregnation of this bundle is made with the following impregnating composition.

|  | Percent by wt. |
|---|---|
| Vinyl pyridine-butadiene-styrene terpolymer (41% by wt. solids—"Gentac") | 30 |
| Water | 70 |

Application of the foregoing impregnating composition is employed in an amount sufficient to deposit dry solids in the bundles constituting between 10–25% by weight of the bundle, and preferably 10–15% by weight.

EXAMPLE 14

Fibers treated in accordance with the procedure of Example 6 are formed into a bundle and impregnated with the following impregnating composition.

|  | Percent by wt. |
|---|---|
| Natural rubber latex-resorcinol formaldehyde resin (38% solids—"Lotol 5440") | 30 |
| Water | 70 |

It is desirable to achieve as full impregnation as possible into the bundles of fibers in order to more effectively separate the fibers one from the other by the impregnant. The deeper the penetration, the more effective will be the bond between the individual fibers in the bundles and the elastomeric material with which the bundles of fibers are combined in the subsequent manufacture of glass fiber reinforced elastomeric products.

It will be understood that various changes and modifications can be made in the details of formulation, methods of application and use without departing from the spirit of the invention, especially as defined in the following claims.

What is claimed is:

1. In the method for the manufacture of glass fiber reinforced elastomeric products in which glass fibers are combined with an elastomeric material whereby the elastomeric material constitutes a continuous phase in which the glass fibers are distributed, the improvement in integrating the glass fibers in the elastomeric material comprising the step of forming a coating of a nascent metal on the glass fiber surfaces in a reducing atmosphere and combining the coated glass fibers in the presence of a reducing atmosphere with the elastomeric material constituting the continuous phase.

2. A method as defined in claim 1 wherein the metal coating is formed on the glass fibers by formulating a glass composition to include a source of the metal and drawing glass fibers from the resulting composition whereby the metal in the composition migrates to the surfaces on the glass fibers to define a coating thereon.

3. A method as defined in claim 1 wherein the metal coating is formed by depositing the metal on the surfaces of the glass fibers.

4. A method as defined in claim 1 wherein the metal coating constitutes from 0.01 to 1% by weight of the glass fibers.

5. A method as defined in claim 1 wherein the metal is a metal having a valence of at least +2.

6. A method as defined in claim 1 wherein the metal is selected from the group consisting of iron, aluminum, magnesium, zinc, cadmium, nickel, cobalt and tungsten.

7. A method as defined in claim 1 which includes the step of coating the nascent metal coated glass fibers with an elastomer compatible material from a non-aqueous dispersion in a reducing atmosphere prior to combination of the fibers with said elastomeric material.

8. In the method for the manufacture of glass fiber reinforced elastomeric products in which glass fibers are combined with an elastomeric material whereby the elastomeric material constitutes a continuous phase in which the glass fibers are distributed, the improvement in integrating the glass fibers with the elastomeric material comprising the steps of forming a coating of a nascent metal on the glass fiber surfaces in a reducing atmosphere, coating the metal coated glass fibers with a non-aqueous dispersion of an elastomer compatible material of an elastomer or a blend of an elastomer and a resin in the presence of a reducing atmosphere, and combining the resulting fibers with the elastomeric material.

9. A method as defined in claim 8 which includes the step of forming the glass fibers coated with the elastomer compatible material into a bundle prior to combination with the elastomeric material.

10. A method as defined in claim 9 which includes the step of impregnating said bundle with a non-aqueous dispersion of an elastomer compatible material prior to combination of the bundle with the elastomeric material.

References Cited
UNITED STATES PATENTS 2,979,424  4/1961  Whitehurst _____ 117—119

WILLIAM D. MARTIN, Primary Examiner

W. H. SCHMIDT, Assistant Examiner

U.S. Cl. X.R.

117—119, 126 GM